C. H. LAWTON.
BEAN PULLING DEVICE.
APPLICATION FILED NOV. 23, 1910.
1,018,916.
Patented Feb. 27, 1912.
2 SHEETS—SHEET 2.
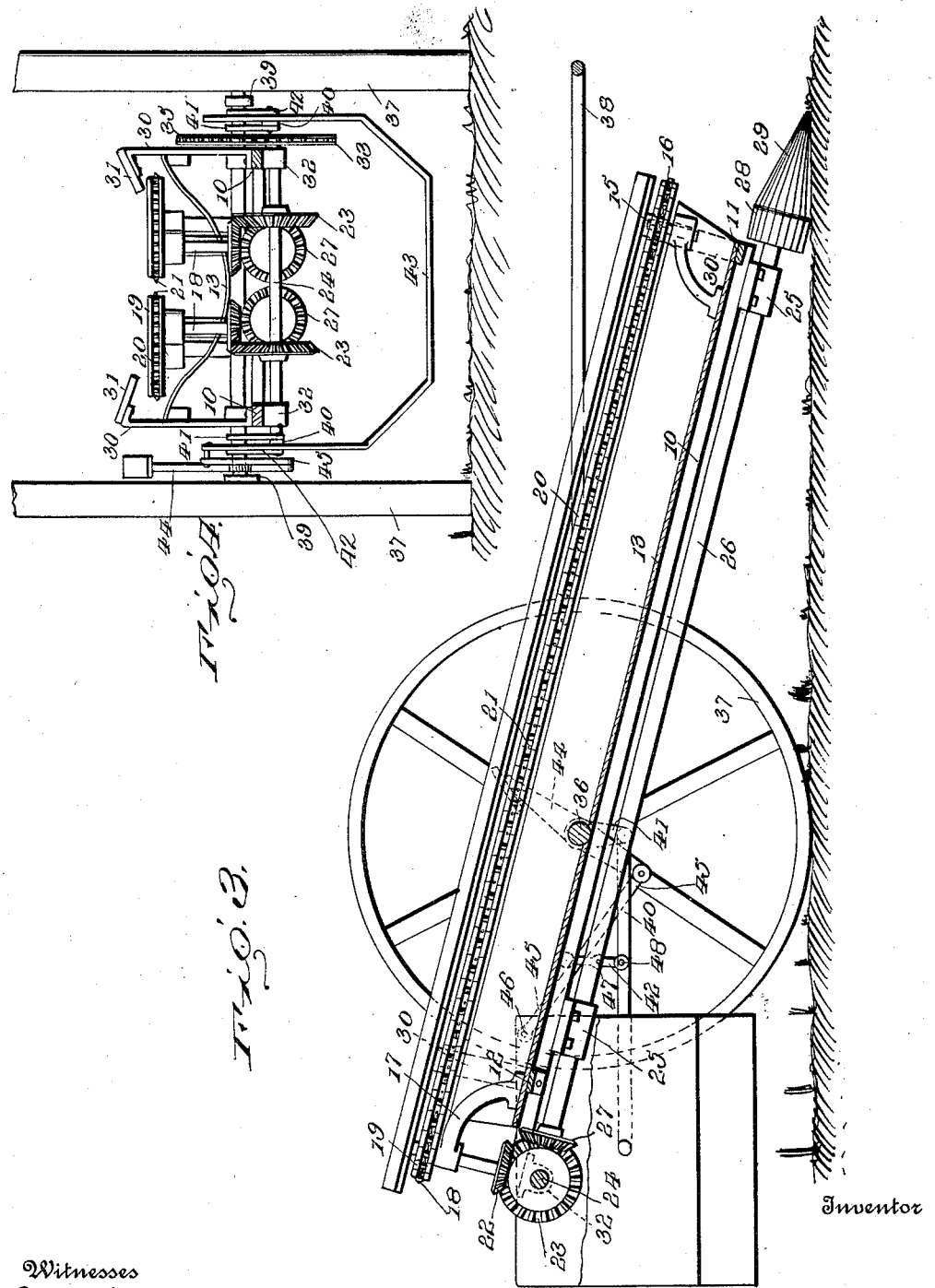

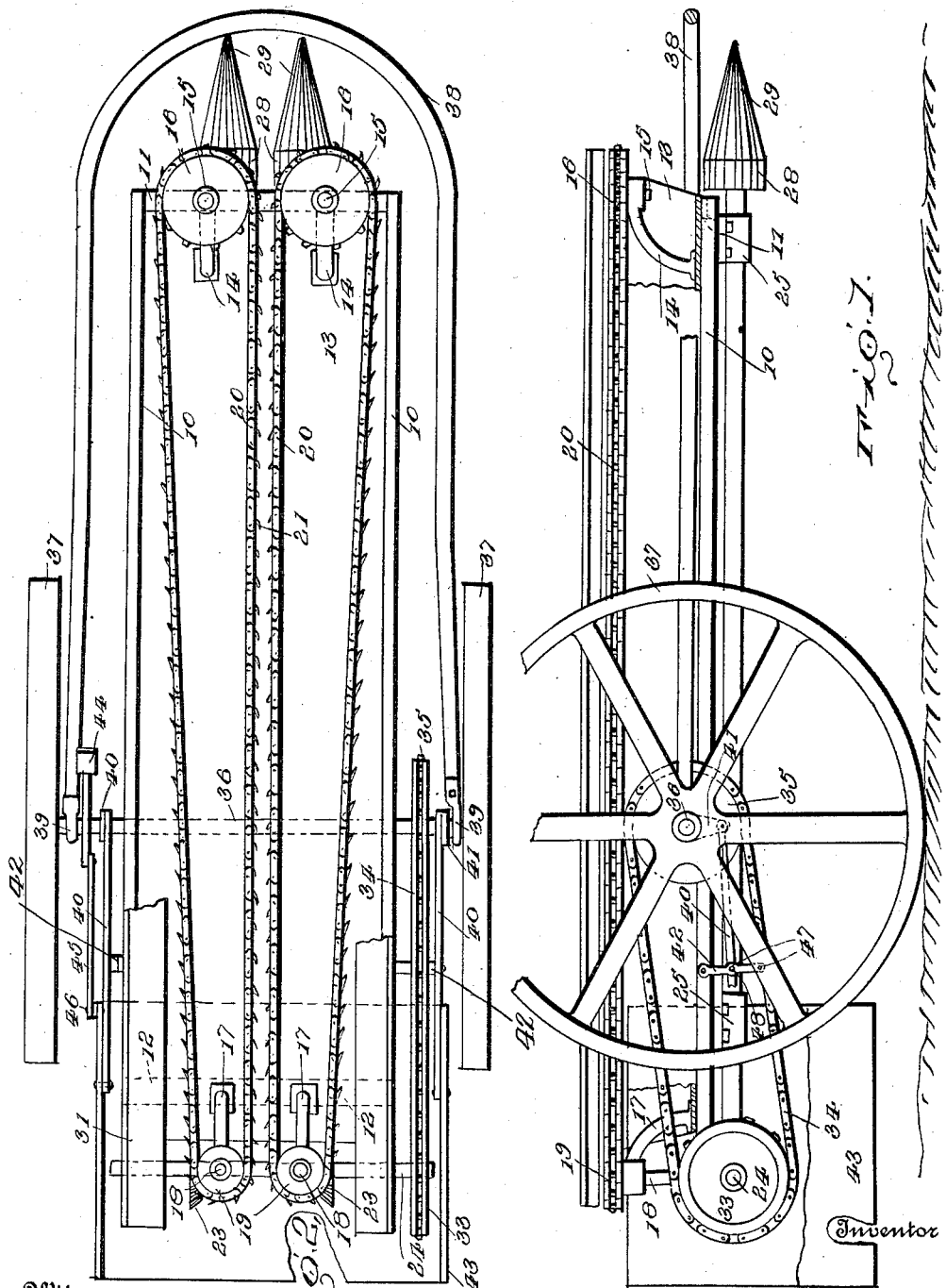

UNITED STATES PATENT OFFICE.

CHARLES H. LAWTON, OF WARSAW, NEW YORK.

BEAN-PULLING DEVICE.

1,018,916.   Specification of Letters Patent.   Patented Feb. 27, 1912.

Application filed November 23, 1910. Serial No. 593,893.

*To all whom it may concern:*

Be it known that I, CHARLES H. LAWTON, citizen of the United States, residing at Warsaw, in the county of Wyoming and State of New York, have invented certain new and useful Improvements in Bean-Pulling Devices, of which the following is a specification.

This invention relates to agricultural machines, and refers particularly to that class of devices, commonly known as bean harvesters or pullers.

An object of this invention is to form a bean harvester having a pair of conical members rotating in opposition so as to grasp the halm and lift it into the path of a traveling elevator belt having grasping fingers which deposit the halm into the buncher or gatherer carried by the machines.

Another object of this invention is to provide the apparatus with an improved buncher and gatherer adapted to receive the vines at the rear end of the machine and to deposit the same upon the ground at intervals by tilting or partially overturning the buncher through the operation of a foot lever.

The invention has for a particular object an improvement in the general construction and arrangement of the parts through which the vines pass during the operation of the machine.

For a full understanding of the invention reference is to be had to the following description and accompanying drawings in which:—

Figure 1 is a side elevation of the improved harvester. Fig. 2 is a top plan view of the improved harvester. Fig. 3 is a longitudinal and central section taken vertically through the harvester. Fig. 4 is a rear elevation of the improved harvester.

Corresponding and like parts are referred to in the following description and indicated in all the views of the accompanying drawings by the same reference characters.

The numeral 10 designates the side bars of the main frame of the harvester which are spaced apart by the forward and rear transverse braces 11 and 12 respectively. The side bars 10 carry across the same an apron 13 extending practically the entire length of the frame and having its opposite longitudinal edges turned up to form a longitudinal trough for the reception of the vines. At the forward end of the frame a pair of brackets 14 are mounted which are bent forwardly and are apertured to provide vertical bearings for pins 15. The pins 15 carry upon their upper ends companion sprockets 16 bearing against the upper faces of the brackets 14. The rear end of the frame is provided with a pair of rearwardly curved or upstanding brackets 17 supporting therein a pair of vertical shafts 18 which project slightly above the brackets 17 through which they are journaled to support a pair of companion sprockets 19. Chains or conveyers 20 pass over the sprockets 16 and 19 and are provided at their outer faces with rearwardly inclined teeth or fingers 21. From Fig. 2 it will be noted that the fingers 21 are positioned so as to extend toward one another and toward the rear end of the frame at the inner adjacent sides of the conveyer 20. The lower ends of the vertical shafts 18 are provided with beveled gears 22 intermeshing with correspondingly beveled gears 23 carried adjacent to the opposite ends of a horizontal drive shaft 24. The frame of the harvester is further provided against its under side and at its opposite ends with straps 25 forming journals for a pair of spaced roller shafts 26 extending the entire length of the frame and carrying in fixed relation upon their rear extremities beveled gears 27 intermeshing with the beveled gears 23. The roller shafts 26 thus receive rotary movement from the main drive shaft 24. The forward ends of the roller bearing shafts 26 are provided with rollers 28 which are arranged at the forward end of the frame and are slightly spaced apart. The rollers 28 are of conical form at their outer ends as at 29 and are longitudinally fluted or corrugated to provide roughened surfaces to catch the vines and raise the same under the action of the rotary motion of the rollers. It will be noted from Fig. 3 that the rollers 28 taper to such an extent that the lower faces of their conical portions lie closely against the upper surface of the ground when the frame is tilted forwardly. The side bars 10 are provided with standards or arms 30 supporting a pair of oppositely disposed and inclined guards 31 partially overhanging the outer sides of the conveyers 20 to prevent the vines from falling over the sides of the harvester.

The transverse operating shaft 24 is journaled adjacent to its opposite ends in bearings 32 depending from the rear ends of the side-bars 10. One end of the operating shaft 24 projects laterally beyond the bearing 32 and carries a sprocket wheel 33 over which passes a chain 34 engaging at its forward end over a sprocket wheel 35 carried upon the main supporting shaft 36. The supporting shaft 36 is journaled across the upper faces of the side-bars 10 toward the rear ends thereof and carries at the sides of the frame the traction or supporting wheels 37. The harvester is provided with a U-shape tongue of draft bar 38 having straps 39 upon its rear ends receiving the shaft 36, the straps 39 being preferably arranged against the inner sides of the traction wheels 37. The forward end of the draft-bar or tongue 38 terminates at a point slightly beyond the forward extremities of the rollers 28.

The improved buncher or gatherer which is carried at the rear end of the frame comprises a pair of rearwardly extending arms 40 which are rigidly secured at their forward ends upon depending lugs 41 rotatably carried upon the axle 36 inwardly of the draft-bar 38. A hanger 42 depends from each of the side-bars 10 and is attached to the central portions of the arms 40 to hold the same in substantially a horizontal position.

The main body of the buncher comprises a U-shape receptacle 43 having the lower corners thereof formed diagonally, as is disclosed to advantage in Fig. 4, and which is open at its ends. The arms 40 are pivoted against the inner sides of the receptacle 43 at their central portions, and the sides of the receptacle extend upwardly about the side-bars 10 a slight distance. A foot lever 44 is hinged at its central portion upon the main supporting shaft 36 and carries upon its lower extremity a link 45. The link 45 extends back to the upper forward corner of the receptacle 43 as at 46 and is pivoted thereto. It is thus observed that a forward movement of the upper end of the pedal or foot lever 44 forces the link 45 back and tilts the receptacle 43 to slide the lines collected in the receptacle from the rear end thereof.

The operation of the improved harvester is as follows:—As the device is drawn along, the forward end of the frame is depressed to engage the conical portions 29 of the rollers against the ground in order to project beneath the vines and slightly raise the same. As the rollers are enlarged at their inner ends the vines are caught therebetween and forced upwardly by the roughened or fluted surfaces of the rollers. It will be noted that as the machine is drawn forwardly the traction wheels 37 rotate the sprocket 35 to operate the chain 34 and turn the drive shaft 24 through the sprocket 33. The beveled gears 27 on the roller shafts 26 intermesh with the inner sides of the beveled gears 23 of the main shaft and thereby rotate the rollers 28 outwardly to effect a lifting action to the rollers. At the same time the vertical shafts 18 are revolved to turn the sprockets 19 outwardly and move the conveyers to carry the teeth 21 up at the central portion of the frame and lift the vines over the apron 13 from the rollers 28. As the fingers 21 grip the vines the same are torn from the ground and are conveyed to the rear end of the frame where they fall from the conveyers 20 into the receptacle 43. When a predetermined number of vines have been collected in the receptacle 43 the operator swings the foot pedal 44 forwardly and tilts the frame 43 to allow the collected vines to slide from the rear end of the receptacle onto the ground. The hangers 42 are provided with vertically spaced openings 47 for the reception of pins 48 which pass through the openings 47 and into the central portions of the arms 40 to adjustably hold the same. This adjustment is desired so that the receptacle may be held above the ground when the frame is horizontal and near the ground when the frame is inclined downwardly at its forward end.

Having thus described the invention what is claimed as new is:—

A bean harvester including a frame, a transverse axle journaled across the frame adjacent to its rear end, rearwardly extending arms hingedly carried upon the axle, hangers depending from the frame and adjustably engaging with the arms between their ends, a gatherer hinged between the rear ends of the arms, and tilting means carried upon the frame and having connection with the gatherer.

In testimony whereof, I affix my signature in presence of two witnesses.

CHARLES H. LAWTON. [L. S.]

Witnesses:
 HARRY TRUAX,
 A. E. KNAPP.

---

Copies of this patent may be obtained for five cents each, by addressing the "Commissioner of Patents, Washington, D. C."